FIG. 1

March 30, 1971  R. E. NUZUM, SR  3,573,027
APPARATUS FOR FORMING BLOWN GLASS ARTICLES
Filed May 8, 1968  7 Sheets-Sheet 2

FIG. 2

INVENTOR.
ROBERT E. NUZUM SR
BY
ATTORNEYS

INVENTOR.
ROBERT E. NUZUM SR
BY
ATTORNEYS

FIG. 10

United States Patent Office 3,573,027
Patented Mar. 30, 1971

3,573,027
APPARATUS FOR FORMING BLOWN
GLASS ARTICLES
Robert E. Nuzum, Sr., Sylvania, Ohio, assignor to
Owens-Illinois, Inc.
Filed May 8, 1968, Ser. No. 727,623
Int. Cl. C03b 9/16, 9/26
U.S. Cl. 65—235        10 Claims

ABSTRACT OF THE DISCLOSURE

In the forming of glass containers by the blow and blow process, a charge of molten glass is formed into a parison, with the parison positioned with its neck down. The parison is transferred from the parison forming position by an invert arm mechanism which supports the parison by its neck. The inverted parison is then expanded into final container shape within a blow mold. A pair of invert arms, mounted for rotation about the same invert axis, are provided so that while a parison is being formed, a previously formed parison is being blown at the blow station. The formed parison is inverted and transferred to the blow station by one neck mold carrying arm while the other neck mold carrying invert arm is opened and reverted to the parison forming side of the apparatus. In this manner a full overlap cycle of operation is carried out such that parisons are being formed and simultaneously being blown into container shapes.

BACKGROUND OF THE INVENTION

This invention relates to the formation of glass containers in what is generally termed an I.S. forming machine. On a conventional I.S. forming machine there is provided a single invert arm which supports the neck molds for inversion and reversion between the parison station and the blow station. The arm may support or carry a single set of neck molds or a double set of neck molds. At the parison forming station a parison mold is supplied with a charge of molten glass and the charge may be either pressed or blown into a preliminary shape. In both instances the parison is formed with its neck down, thus the invert arm which carries the particle neck mold is positioned beneath the parison mold with the neck mold in axial alignment with the parison mold cavity.

Conventionally, in the "blow and blow" process, the charge of molten glass is "settle-blown" in the parison mold, a procedure wherein the charge of glass is forced downward into intimate contact with the neck mold and a neck pin extending into the neck mold. The neck pin is then retracted and a supply of air under pressure is forced through the neck of the parison to form it into a hollow form. In the "press and blow" process the charge of glass in the parison mold is press molded by the insertion of a pressing plunger through the neck mold cavity into the parison mold. After the parison has been formed, the parison mold is opened or otherwise removed from the parison and the neck mold carrying invert arm swings through an arc of approximately 180° and the parison is located between the open halves of split blow molds. The blow mold is closed about the parison and the parison is expanded into final shape within the mold.

An example of a conventional I.S. type forming machine is disclosed in U.S. Pat. No. 1,911,119 to Ingle issued May 30, 1933.

As can readily be seen in the normal I.S. forming cycle wherein a single neck mold arm is employed, the neck mold arm must be inverted and then again reverted before it is possible to form another parison.

With the present invention, by utilizing two invert arms operating in timed relationship so as to function alternatively, it is possible to form parisons and blow parisons at the same time. The inverting of parisons takes place at the same time that the other neck mold arm is being reverted.

SUMMARY

The invention relates to apparatus for forming blown glass articles in which parisons are formed at a parison forming station and the parisons are expanded at a blow station. The mechanical arrangement for transferring the formed parisons from the parison station to the blow station is in the form of a double invert mechanism in which a driven spindle is alternately latched and unlatched from the pair of invert arms so that as the invert arm which is moving the parisons from the parison forming station to the blow station, the second invert arm is driven in the opposite or revert direction and is open to permit the parison carrying arm to pass therebetween. The spindle is rotated 180° each invert cycle when latched to the arms. During the unlatched period the neck molds, supported by the invert arm at the blow station, are opened by cam means driven by the same motor for the invert drive.

Figure 1:
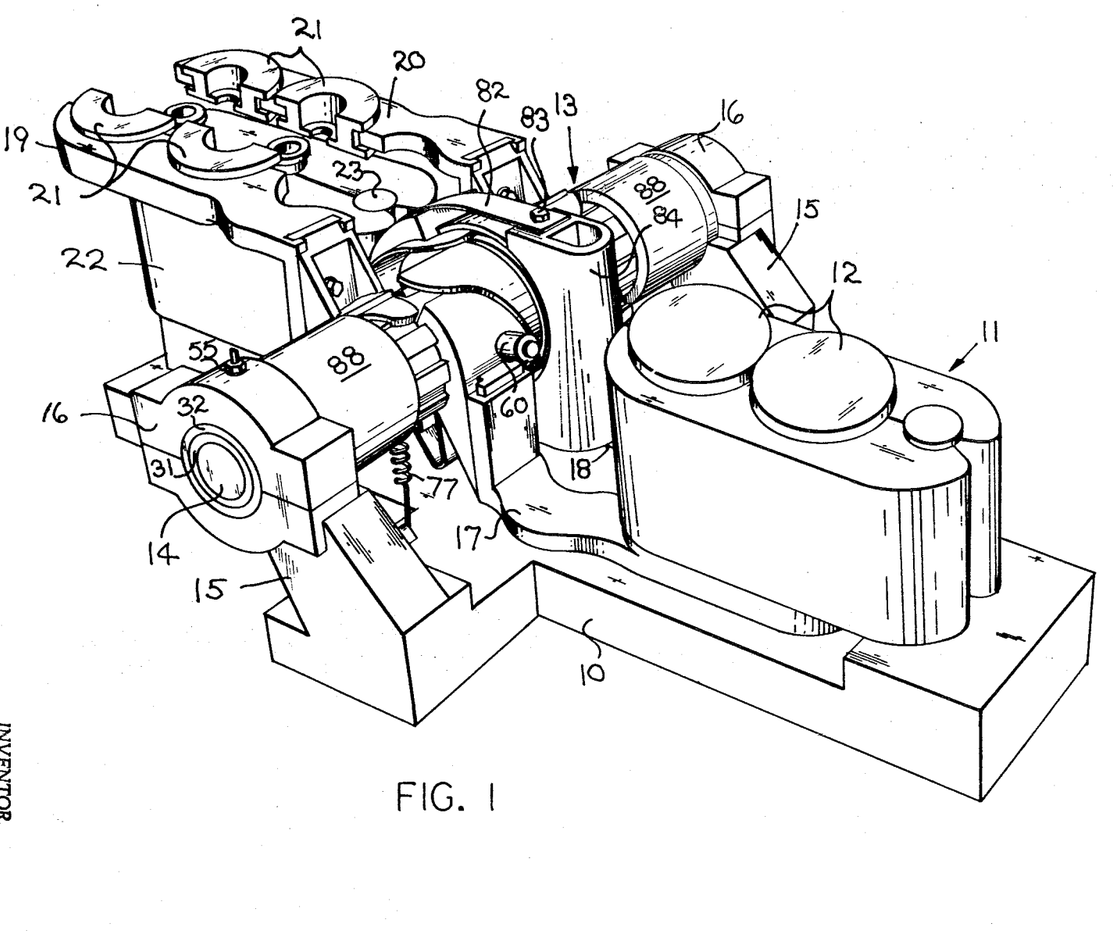
FIG. 1 is a perspective view of the forming machine of the invention.

With particular reference to FIG. 1, the general organization and arrangement of the invention with respect to the conventional forming molds will be described.

In general, the Hartford I.S. machine, as fully disclosed in U.S. Pat. 1,911,119 to Ingle, is composed of a base 10 to the right side of which are mounted split parison or blank molds 11. These molds have cavity shapes in the form of the parisons to be formed therein. The parison molds 11 are loaded by dropping mold charges through the upper, open ends and after a pair of baffles 12 are seated in the openings, the parisons are counter-blown or pressed into shape. Mechanism for opening and closing the parison molds and for raising, lowering and seating the baffles 12 is not shown, it being understood that this mechanism is of conventional design.

The parison transfer and invert mechanism, generally designated 13, to which the present invention is specifically directed, takes the form of a generally horizontal spindle 14. The spindle 14 is supported above the base 10 by a pair of upstanding bosses 15 to which semi-annular bearing clamps or caps 16 are connected in supporting relationship with respect to the ends of the spindle 14.

As will later be explained in detail, the spindle 14 is rotated periodically in a counter-clockwise direction, as viewed in FIG. 1.

A pair of neck mold carrying arms 17 and 18 together constitute one invert arm mechanism, it being understood that the arms 17 and 18 respectively carry halves of neck molds and in cooperation with the blank mold define the parison cavity. A second pair of neck mold arms 19 and 20 are supported by the spindle 14 and, as viewed in FIG. 1, are shown open relative to each other with each arm holding a neck mold half 21. The particular design of the machine disclosed is a dual cavity machine intended to make two bottles simultaneously.

Immediately beneath the neck mold arms 19 and 20, there is positioned a split blow mold 22. The halves of the blow mold 22 are adapted to pivot about the hinge pin 23. In the normal operation of the I.S. machine, after the parisons are blown, the blow molds will be hinged open and the ware, which is positioned on bottom supporting plates (not shown), will be lifted by their necks simultaneously from the blow station and transferred to a cooling position from which the ware is later moved into a lehr for final heat treatment.

It will be readily apparent when viewing FIG. 1, that the mechanism of the invention distinguishes from the conventional I.S. machine by the fact that there are two sets of neck mold arms rather than a single set.

The sequence of operation of the mechanism disclosed in FIG. 1, is such that the formation of a parison in the parison mold 11 is taking place while a previously formed parison is being blown to final shape in the blow mold 22. At this time one set of neck mold arms is closed while the other set is open. While the parison is being formed and the bottle is being blown, the neck molds positioned at the blow station are open so that the ware may then be removed. At a slightly later point in time the parison mold 11 is opened and the parisons will be supported in a neck-down position within the neck molds carried by the arms 17 and 18. The neck mold arms 17 and 18 are then rotated counter-clockwise by mechanism to be more fully disclosed later, while at the same time the neck mold arms 19 and 20, which are open, are reverted past the closed arms 17 and 18. After the neck mold arms carrying the parisons have passed between the open, reverting neck mold arms 19 and 20, the open arms will close or move toward each other and be positioned in the parison forming station. With the completion of the invert, the blow mold is closed about the parisons, the neck molds are opened to release the parisons, the parisons are expanded, and the parison mold is closed in relation to the closed neck molds carried by the neck mold arms 19 and 20. This cycle is repeated in succession so as to simultaneously produce parisons while previously made parisons are being blown. Referring specifically to FIGS. 2–10, the invert or transfer mechanism 13 will be described in detail.

The central spindle or shaft 14 extends the full length of the invert mechanism and serves as the primary support for the neck mold carrying arms. The shaft 14 is provided with a passage 24 extending from adjacent one end thereof to approximately the mid-point of the length of the shaft. It should be understood that the spindle 14 is symmetrical with respect to its ends, with the only exception being that one end only is provided with the passage 24, and later-to-be described cam members are mirror images of each other.

Figure 10:
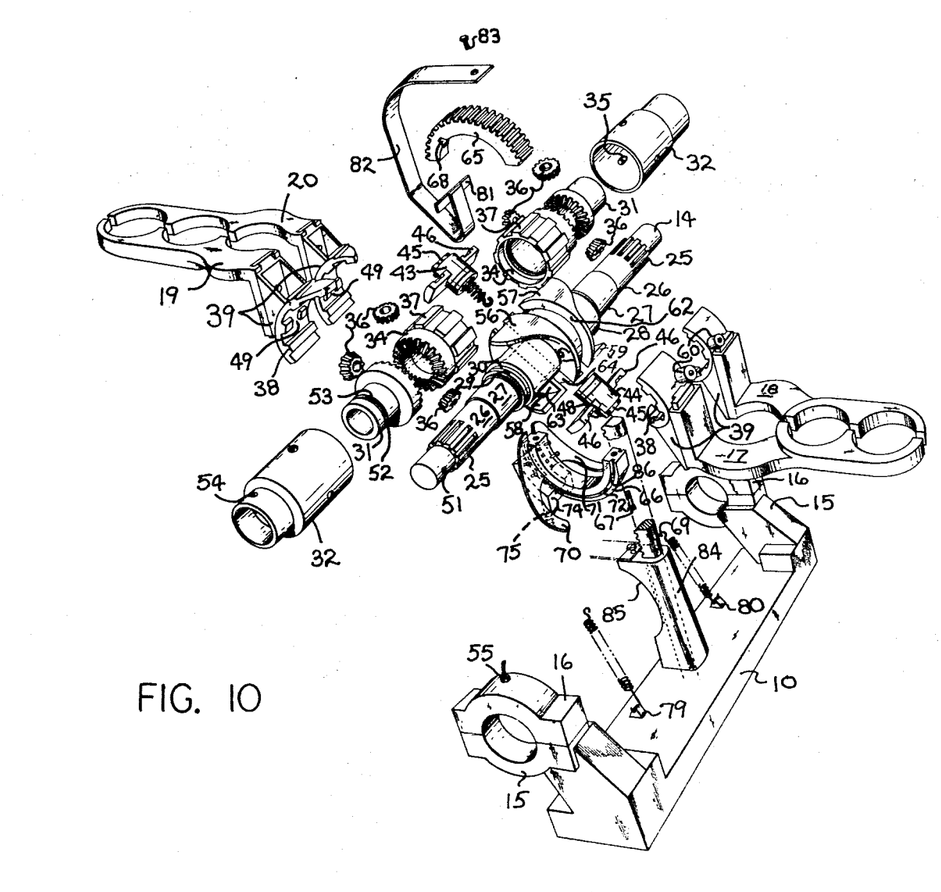
FIG. 10 is an exploded, perspective view of the apparatus of FIG. 7.

The spindle 14, as perhaps best shown in the exploded view of FIG. 10, is formed with radial splines at 25 adjacent the ends thereof. Inwardly of the splined areas 25, the spindle 14 is provided with a smooth, cylindrical portion 26 having the same diameter as the maximum diameter of the splined area 25. The cylindrical portion 26 is contiguous with the splined portion 25 and receives a sleeve bearing 27 thereof. The spindle 14 is formed with a larger diameter portion 28 which is generally cylindrical and symmetrical with respect to the axis of the spindle. The sleeve bearing 27 surrounds part of the cylindrical portion 26 of the spindle 14 and its inner end abuts a ledge formed by the increased diameter portion 28 of the spindle 14 with the interpositioning of a pair of bearing races 29 and 30 between the sleeve and the ledge.

The splined ends of the shaft 14 support a pair of annular, internally splined, bevel gears 31. The splines on the bevel gears 31 cooperate with the splines 25 on the shaft 14 and thus the bevel gears and shaft rotate as a unit, it being understood that there is a bevel gear 31 at each end of the spindle 14.

An annular sleeve or housing 32 surrounds the bevel gear 31 and extends axially of the shaft 14. This sleeve is supported by mounting caps 16 and boss 15. The housing 32, of which there is one at each end of the shaft 14, is fixed to and held stationary by a boss 15 and cap 16. An annular thrust bearing 33 is positioned between the housing 32 and an annular ledge formed on the exterior of the bevel gear 31. The bearing 33 and the bearings 29 and 30 serve as thrust bearings to prevent excessive wear since the bevel gear 31 rotates relative to the housing 32 and a second bevel gear 34 rotates relative to spindle 14. In the case of the bearings 29 and 30, the second annular bevel gear 34, which is mounted coaxially with and fitted on the sleeve 27, is held with clearance with respect to the cylindrical portion 28 of the spindle 14.

The housing 32 supports three equally spaced, radial, inwardly extending pins 35. The pins 35 serve as the axle for idler gears 36. The idler gears 36 are mounted to rotate with respect to their pins; however, the pins being fixed in the housing 32, are held stationary since the housing itself is clamped against any possible rotation. Both bevel gears 34 are externally splined at 37 along a portion of their length. The splined portion 37 of the bevel gear 34 cooperates with internally splined portions 38 of semicylindrical mold arm mounting blocks 39. Each of the blocks 39, of which there are four, one associated with each neck mold half carrying invert arm, are in the form of vertically elongated members having a substantially vertical dovetail portion 40. Each of the invert members 17, 18, 19 and 20 are generally L-shaped in elevational view, with the base of the L extending vertically and being formed with an internal dovetail slot 41 engageable with the dovetail portion 40 of the mounting blocks 39. The four individual arm members are mounted respectively to individual mounting blocks and held in place by set screws.

As previously explained, each of the mounting blocks is formed with a semi-cylindrical, internally splined portion 38, with the splined portion adapted to be engaged with the splines 37 formed on the barrel portion of bevel gears 34. This inter-engagement between the splines 38 and 37 occurs when the pair of invert arms located at the blow station are moved apart to release the ware preparatory to the open invert arms being reverted from the blow molding station to the parison forming station. When the arms are closed they have their splined portions 38 in sliding engagement with the cylindrical surface of the portion 28 of the spindle 14.

Splined portions 38 of the arm mounting blocks 39 present substantially vertical planar surfaces at their adjacent sides and present inwardly tapering surfaces at their opposed sides. The function of the tapering surfaces will be apparent from the following description relative to the operation of the mechanism as a whole.

Figure 2:
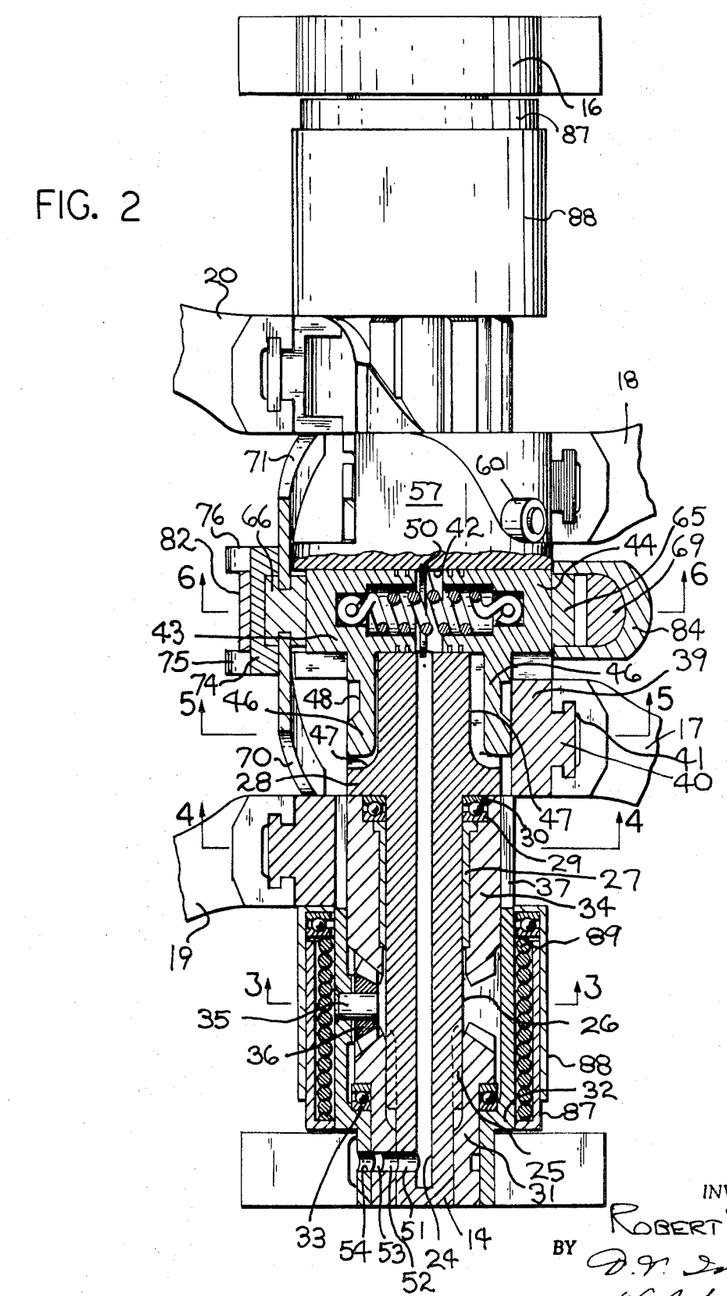
FIG. 2 is a top plan view, partially in section, of the invert arm supporting structure of the invention.
Figure 3:
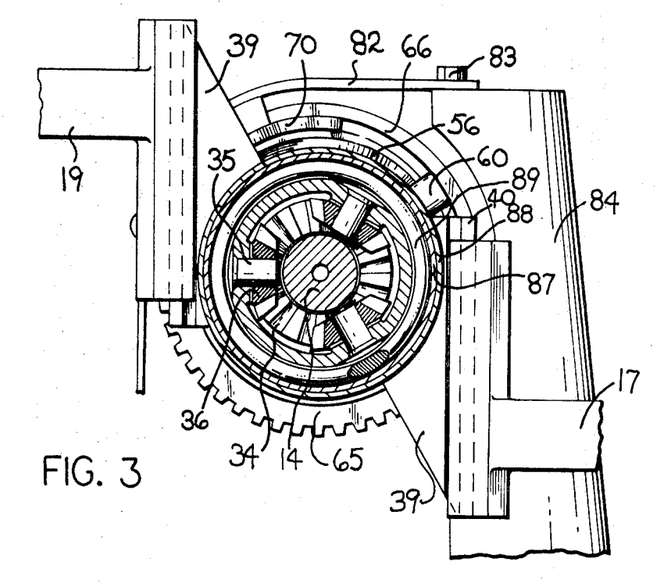
FIG. 3 is a cross-sectional view taken at line 3—3 of FIG. 2.
Figure 4:
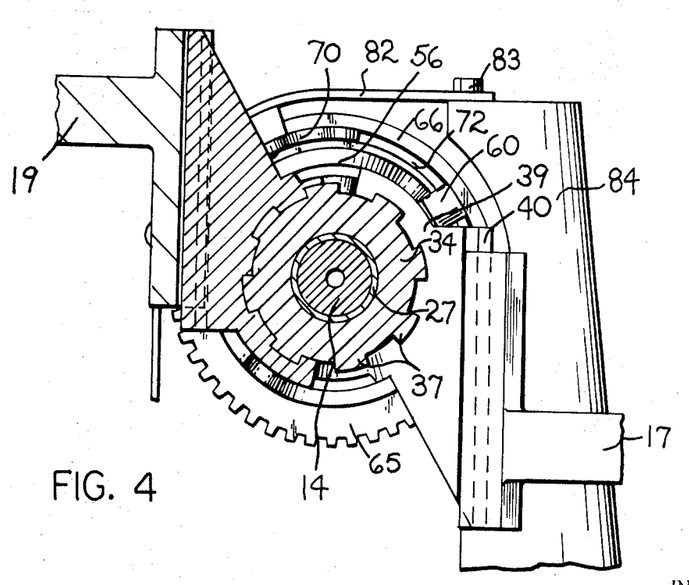
FIG. 4 is a cross-sectional view taken at line 4—4 of FIG. 2.
Figure 5:
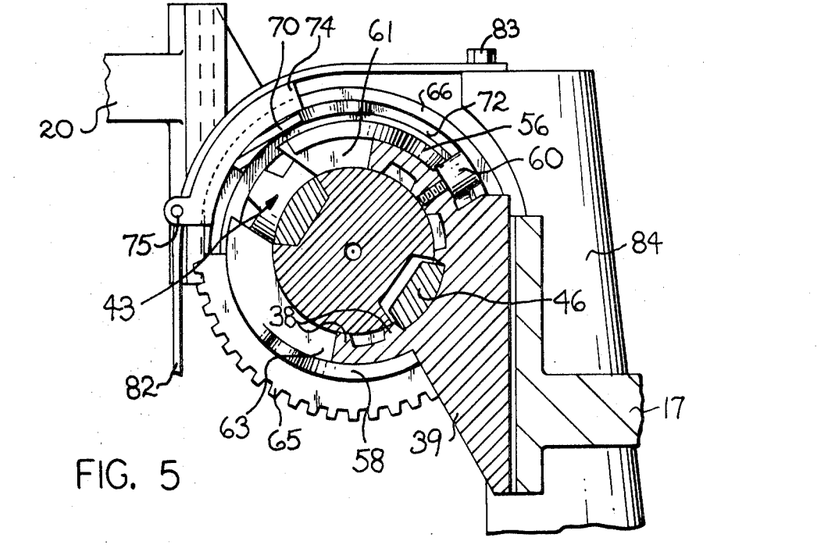
FIG. 5 is a cross-sectional view taken at line 5—5 of FIG. 2.
Figure 6:
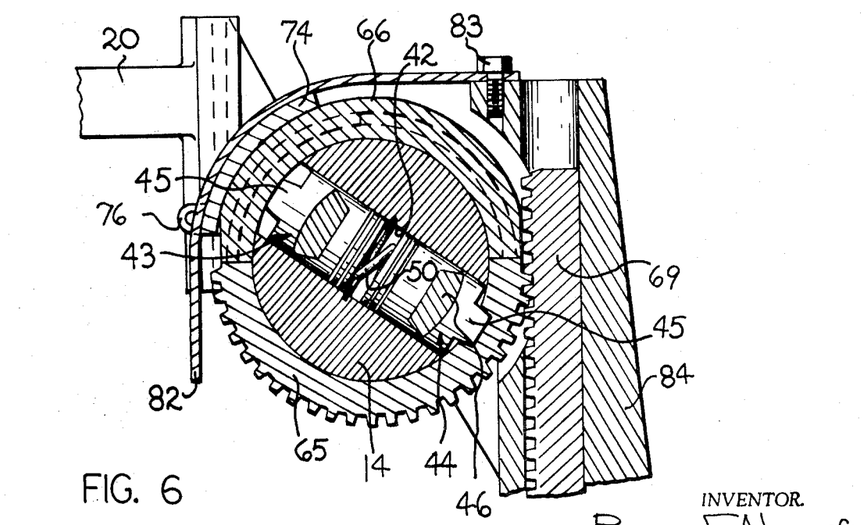
FIG. 6 is a cross-sectional view taken at line 6—6 of FIG. 2.

As best shown in FIGS. 2 and 6, the center of the spindle 14 is formed with a cylindrical opening 42 extending diametrically therethrough. The opening 42 serves as a cylinder within which a pair of oppositely positioned piston members 43 and 44 are guided. Each of the piston members 43 and 44 has a latching head 45 at their opposed ends. Each piston member has a pair of diametrically opposed, outwardly extending locking bars 46 joined thereto intermediate the length of the piston. The locking bars 46 are adapted to retract within grooves 47 formed in the portion 28 of the spindle 14. (See FIG. 2.) The locking bars 46 have a radius of curvature in their outer faces which substantially matches with the radius of curvature of the cylindrical portion 28 of the spindle 14 so that when they are retracted or seated within their respective grooves 47, the cylindrical surface 28 of the spindle 14 is substantially uninterrupted.

In addition, each of the locking bars 46 is formed with a pair of cut-out slot portions 48, only one of which is clearly shown in the drawings. However, it should be understood that the cut-out portions 48 are allochirally formed with respect to each of the bars 46. The effect of the cut-outs 48 is to give the surface of the bar 46 an I-shaped locking head which will seat between the splines 38 of the arm mounting blocks 39. A pair of adjacent splines 38 are interrupted at 49 (see FIGS. 9 and 10) and the outer end of the bar 46 which has the surface appearance of an I is adapted to seat within the space 49 of the interrupted splines formed in the interior of the blocks 39. The stem portion of the I formed by the extending end of the locking bars 46 will seat within the space between the adjacent spline. It should be noted that with respect to splines 38 formed on the interior of the arm mounting blocks 39, that two adjacent splines are interrupted in their length so as to provide the locking areas 49 for the locking bars 46. The locking bars will function only when the invert arms are in closed position.

The piston lock members 43 and 44 are normally held in retracted position by a tension spring 50 connected therebetween. The piston lock members are moved apart by introduction of fluid under pressure through the passage 24 in the spindle 14. Fluid under pressure reaches the passage 24 through a radial port 51 formed in the spindle 14. The port 51 is in registry with a port 52 and annular groove 53 formed in the bevel gear 31 so as to provide communication between a port 54 and port 51. The housing 32 is provided with the port 54 which in turn is in communication with the inlet fitting 55 (FIGS. 1 and 10) connected to the cap 16. Fluid under pressure is introduced through the fitting 55 to the pistons 43 and 44 at a predetermined time sequence dictated by the operation of the overall forming machine.

Figure 7:
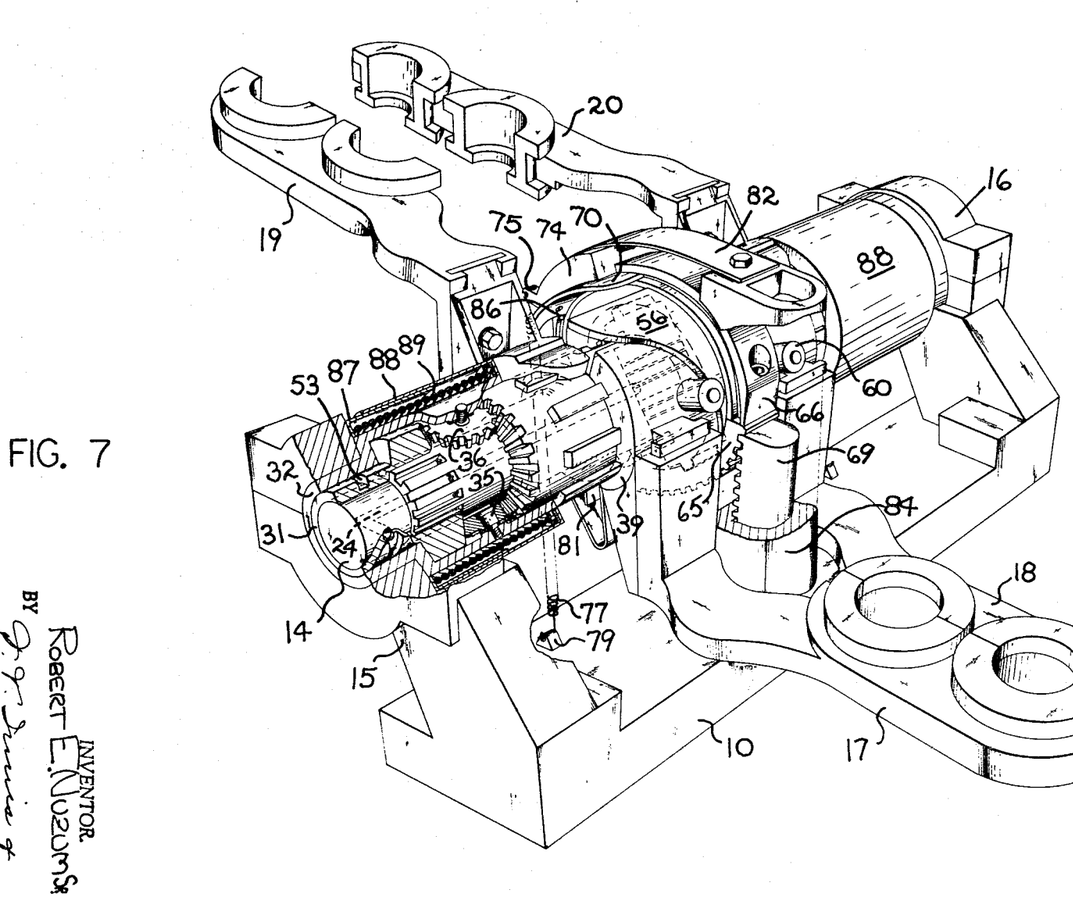
FIG. 7 is a perspective view, with parts broken away, of the invert arm assembly of the invention.

As best shown in FIGS. 7 and 10, the spindle 14 carries four cam members 56, 57, 58 and 59. These cams 56, 57, 58 and 59 are arm-regulating closing cams and each arm 17, 18, 19 and 20 is provided with a cam following roller 60. The cams 56, 57, 58 and 59 are formed as axially extending members joined to the spindle 14 by radially extending planar portions 61, 62, 63 and 64.

As can be seen when viewing FIG. 10, the planar portions 61 and 62 define an annular, cylindrical gap therebetween within which a segment gear 65 is positioned. The segment gear 65 and a cam-supporting slide 66 are joined together by bolts 67 and together form a complete annular ring confined between the cam supporting webs 61, 62, 63 and 64. The inner surface of the segment gear 65 is provided with a notch 68 which extends the full width of the gear and within which the latching head 45 of the piston lock members 43 and 44 are adapted to seat. The segment gear 65, as clearly shown, is formed with external teeth which are in engagement with the teeth formed in a vertical rack 69. The rack 69 is the principal invert driving means and is reciprocated by a double-acting fluid motor (not shown). The drive motor for the rack is of the conventional design presently used on all I.S. forming machines as the invert drive motor.

Figure 8:
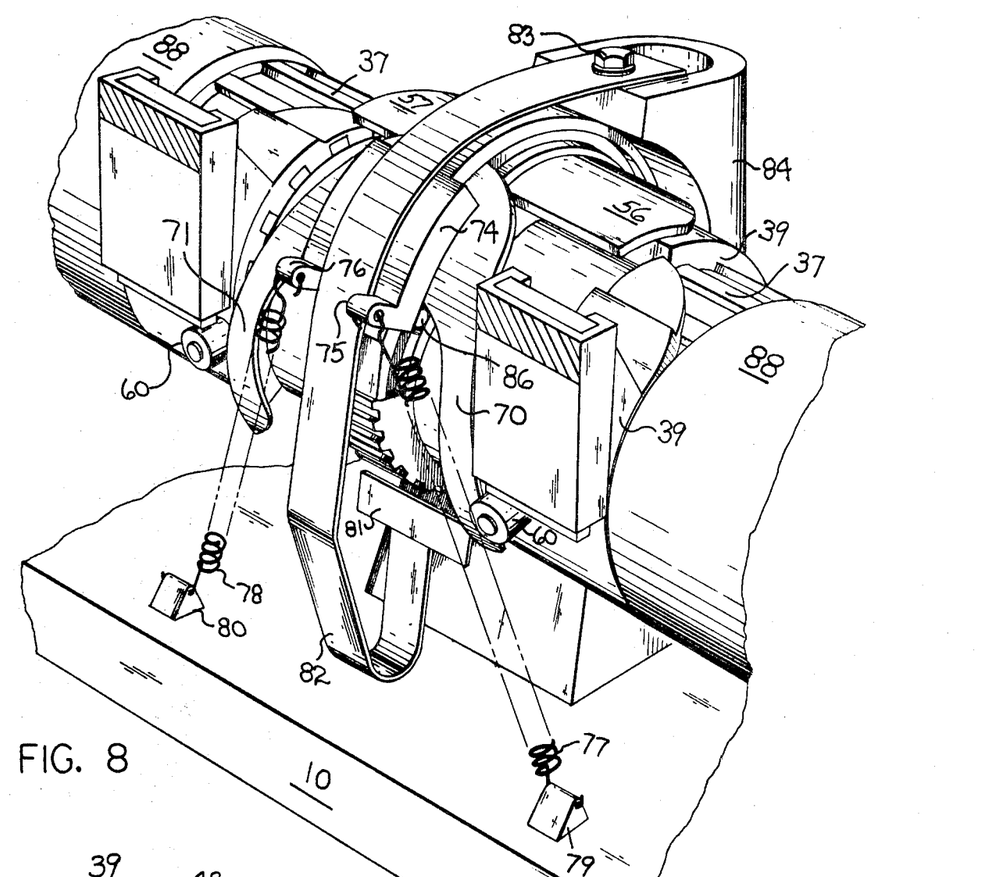
FIG. 8 is a perspective view of a portion of the invert arm assembly of FIG. 7 viewed from the rear.
Figure 9:
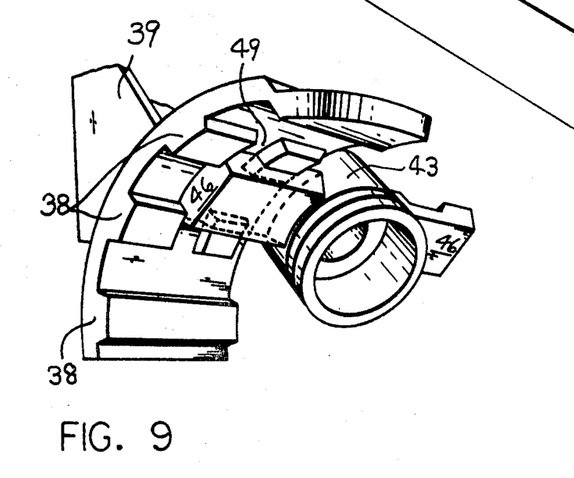
FIG. 9 is a detailed, perspective view on an enlarged scale illustrating the relationship of locking piston and splined portion of one arm.

A pair of arm-opening cam members 70 and 71 are slideably received in arcuate cut-out portions 72 and 73 formed in the sides of the slide 66. The cams 70 and 71 are both joined to a mounting block 74, with the lower portion of the block 74 being provided with a pair of spring-anchoring bosses 75 and 76 (FIG. 8). Elongated helical springs 77 and 78 are connected at one end to the bosses 75 and 76 and extend downwardly to a pair of mounts 79 and 80 fixed to the main base 10 of the invert mechanism. The cams 70 and 71 and the mounting block 74 are free to move relative to the slide except that they are confined in their movement in a counter-clockwise direction by a stop member 81. The stop member 81, as best shown in FIGS. 8 and 10, is fixed to the upwardly turned, lower end of an elongated strap 82 whose opposite end is bolted at 83 to the upper surface of a vertical guideway 84 for the rack 69. The guideway 84 is mounted to the base 10 and extends generally vertical and is formed with an arcuate cut-out portion 85 which corresponds to the radius of curvature of the gear 65 and slide 66.

The springs 77 and 78 which are tension springs, hold the cam-mounting block 74 in engagement with the stop 81 during the invert and revert motions of the arms. It should be understood that parisons will be formed at the parison station and parisons expanded at the blow station during the period after transfer and before opening of the molds. However, shortly after invert the gear segment 65 is unlocked from the spindle 14 by shutting off fluid pressure to the interior of the spindle 14 and movement of the rack 69 downwardly will cause the slide 66 and segment gear 65 to rotate in a clockwise direction through 180° without rotating the spindle 14. This movement continues until such time as pin 86, positioned within the cut-out portions 72 and 73 of the slide 66, engages the cams 70 and 71 causing the cams to move upwardly in a clockwise direction as viewed in FIGS. 1 and 10. As the cams 70 and 71 move upwardly, they will engage the rollers 60 on the arms 19 and 20 positioned at the blow station so as to effectively open the arms 19 and 20. Opening of the arms and the neck molds will release the ware at the blow station so that after expansion it may then be moved, by mechanism not shown, from the blow station to a conventional dead plate. It should be understood that after the expansion of the parisons, the blow molds are also opened so as to provide ready access to the ware. The neck molds arms 19 and 20 are free to open because the locking member 43 and its latching heads 46 have been retracted, as explained above, thus permitting the arms to move outwardly with respect to each other and onto the splined portion 37 of the bevel gear 34. At this point in time in the cycle of operation of the invert mechanism, the notch 68 of the segment gear 65 will now be positioned directly opposite the latching head 45 of the other piston lock member 44 so that upon introduction of fluid under pressure to the interior of the spindle 14, its latching head 45 will engage the notch 68. Also, when the head 45 of the lock member 44 moves into the notch 68, the latching bars 46, with their undercut surfaces 48, move into the grooves between the splines 38 of the arms 17 and 18 and fall within the interruptions 49 in the splines in the same manner as described above with respect to arms 19 and 20, which, in effect, serve to latch the two arms 17 and 18 together as a unit and to lock the arms to the spindle 14.

The parison mold halves have opened and the mechanism is now ready to begin an invert transfer operation by the vertical upward movement of the rack 69. As the rack moves upwardly, it drives the segment gear 65 which in turn is locked by the locking member 44 so that the spindle 14 also rotates in a counter-clockwise direction, as viewed in FIGS. 7 and 10. Counter-clockwise rotation of the spindle 14 will cause counter-clockwise rotation of the bevel gears 31. Rotation of the bevel gears 31, through the idler gears 36, causes clockwise rotation of the bevel gears 34. The arms 19 and 20, which have been moved out onto the splined areas 37 of the bevel gears 34, will begin to move in a clockwise direction, while the arms 17 and 18, now latched together and locked to the spindle 14, will move in a counter-clockwise direction.

The cams 56 and 57 tend to maintain the arms 19 and 20 in their open position. The outer edges of the mounting blocks 39 for the arms 17 and 18, as the arms 17 and 18 begin to move in relation to the arms 19 and 20, will pass between the open arms 19 and 20, maintaining the arms 19 and 20 open. As the arms 17 and 18, which carry the parisons, have passed between the arms 19 and 20, the cams 70 and 71 will have been moved down to the position where their mounting block 74 is now in engagement with the stop 81 and the cams 58 and 59 will be in engagement with the rollers 60 carried with the arms 19 and 20.

A pair of outboard biasing sleeves 87 and 88, which are telescopically arranged with respect to each other and confining a compression spring 89 therebetween, will be in engagement with the mounting blocks carrying the arms 19 and 20. Bearings are provided at the end of the sleeve 88 which engages the arms 19 and 20 so that the sleeve 88 may rotate with the movement of the arms without causing undue frictional drag. The spring 89 will bias the arms 19 and 20 in a closing direction so that the rollers 60 carried by the arms 19 and 20 will ride on the cams 58 and 59, regulating the closing rate of the two arms 19 and 20 so that they will be fully closed at the time of arrival at the parison-forming position at the right in FIG. 1. This movement of the arms into parison forming position and inversion of the parisons to the blow station, completes the cycle of the invert mechanism and the cycle repeats itself so that the apparatus disclosed herein makes blown glass articles, such as bottles, during each cycle of the machine.

Other and further modifications may be resorted to within the spirit and scope of the appended claims.

I claim:

1. In an apparatus for forming blown glass articles in which a parison is formed from a charge of molten glass in a parison mold and neck mold and then transferred, by inversion of the neck mold, to a blow mold, the improvement comprising two sets of neck mold carrying invert transfer arms alternately movable into alignment with the parison mold and the blow mold, a horizontal spindle, means mounting said neck mold arms on said spindle for pivotal movement about the axis of the spindle, an annular ring rotatably mounted on said spindle, means for oscillatably rotating said ring on said spindle, engaging means carried by said spindle in underlying relationship to said ring and arm mounting means for selectively latching said ring to said spindle and arm for moving one set of arms from the parison mold to the blow mold, said other set of arms moving in the opposite direction, whereby said arms are alternately moved between said parison mold and blow mold with the other set of arms being open to permit movement of the arm with the parison to move therebetween.

2. The apparatus of claim 1, wherein said means for oscillatably rotating said ring comprises an elongated rack and cooperating gear means formed on said ring.

3. The apparatus of claim 1, wherein said engaging means comprises at least one piston member having a latching head mounted for radial movement with respect to the spindle and means formed in the ring for engagement by said latching head.

4. The apparatus of claim 3, further including spring means attached to said piston for biasing said piston member out of engagement with said ring and means for introducing fluid under pressure to the interior of said spindle for moving said piston member into engagement with said ring to latch the ring to the spindle.

5. The apparatus of claim 1, further including cam means slidably mounted on said ring for movement relative thereto upon rotation of said ring in one direction and movement with the ring during a portion of the ring's rotation in the opposite direction, cam follower means mounted on each arm of said sets of transfer arms and engaged by said cam means during movement of the cam means with rotation of the ring for moving the individual arms of one set of transfer arms apart at the blow mold position.

6. The apparatus of claim 1, further including a first pair of annular bevel gears mounted adjacent the ends of said spindle and rotatable therewith, housing means overlying the ends of said spindle and said annular bevel gears, plural idler gears supported for rotation by said housing and meshing with said first pair of bevel gears, a second pair of annular bevel gears meshing with said idler gears and rotatably supported by said spindle for relative rotation with respect thereto, means formed on said second bevel gears for engaging the transfer arms that are open, whereby rotation of spindle in one direction will rotate said second pair of bevel gears in the opposite direction .

7. The apparatus of claim 6, wherein said means for engaging said open arms comprises a cylindrical sleeve portion formed as part of said second bevel gears and splines formed on said sleeve portion, and cooperating internal splines formed on the means mounting said arms, whereby opening of said arms moves said splines into cooperative, engaging position.

8. The apparatus of claim 7, wherein said engaging means comprises at least one piston member having a latching head mounted for radial movement with respect to the spindle and means formed at a preselected point in said ring for engagement by said latching head.

9. The apparatus of claim 8, wherein said engaging means comprises a pair of diametrically opposed movable piston members and further including spring means attached between said piston members for biasing said members toward each other out of engagement with said ring and means for introducing fluid under pressure to the interior of said spindle for moving said members outwardly into engagement with said ring to latch the spindle to the ring.

10. The apparatus of claim 9, further including locking bars carried by said piston members and seated between the splines formed on the arm mounting means, said splines being interrupted in their length and said locking bars being formed with enlarged ends for seating in the interrupted portion of said spline, whereby said transfer arms are held against lateral movement when the piston member is in driving engagement with said ring.

References Cited

UNITED STATES PATENTS

| | | | |
|---|---|---|---|
| 3,230,061 | 1/1966 | Trudeau | 65—241X |
| 3,434,820 | 3/1969 | Zappia et al. | 65—241X |

S. LEON BASHORE, Primary Examiner

S. R. FRIEDMAN, Assistant Examiner

U.S. Cl. X.R.

65—241, 264